being preferred and

3,257,396
CERTAIN 1,3-BENZOXAZINONE DERIVATIVES
John Koo, Irvington, N.Y., assignor to Geigy Chemical Corporation, Greenburgh, N.Y., a corporation of Delaware
No Drawing. Filed June 11, 1962, Ser. No. 201,336
7 Claims. (Cl. 260—244)

This invention relates to certain novel derivatives of 1,3-benzoxazinone, which possess valuable pharmacological properties and are useful as pharmaceutical agents. This invention also pertains to processes for their manufacture.

More particularly, this invention resides in heterocyclic derivatives of 2,3-dihydro-1,3-benzoxazinones which may be designated as 2-(heterocyclic substituted)-2,3-dihydro-4H-1,3-benzoxazine-4-ones and represented by the following general formula:

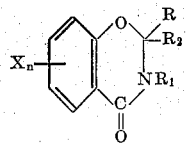

wherein:

R and $R_1$ represent hydrogen or lower alkyl
$R_2$ stands for 2-, 3-, or 4-pyridyl, 2- or 4-pyrimidyl, 2-thiazolyl, 2- or 3-thienyl or 2-furyl
X is hydrogen, halogen—particularly, chlorine and bromine—hydroxy, lower alkoxy, lower alkyl, amino or nitro or lower alkylenedioxy, particularly, methylene- or ethylenedioxy
n is an integer of from 1 to 3

The qualification "lower" as applied to alkyl and alkoxy means that the groups in question have a carbon content of $C_1$ to $C_2$ and are inclusive of both straight-chains and branched chains.

The compounds of this invention may be synthesized by a reaction involving the condensation of an appropriate salicylamide with a heterocyclic aldehyde or ketone. This synthesis may be graphically illustrated by the following equation:

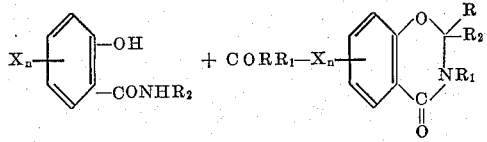

wherein the given symbols are as defined hereinabove.

More specifically, the subject compounds may be prepared by the following preferred procedure: the above-mentioned starting materials which are commercially available or prepared by well-known syntheses, are reacted under reflux in a medium consisting of inert organic solvents, such as chloroform, carbon tetrachloride, ethylene dichloride, etc. with chloroform being preferred and in the presence of an acid catalyst, e.g. sulfuric, phosphoric, hydrochloric p-toluenesulfonic, benzenesulfonic, methanesulfonic acids, etc. The water formed is removed azeotropically and the desired product is worked up and purified.

The present invention comprehends not only the above-described derivatives of 1,3-benzoxazinone in their free base form, but it also includes pharmaceutically acceptable non-toxic acid addition salts which may be formed from said compounds in accordance with conventional practice, by using appropriate inorganic and organic acids, such as hydrohalic acids, especially hydrochloric and hydrobromic acids, sulfuric, methansulfonic and phosphoric acids as well as acetic. aminoacetic, lactic, succinic, malic, aconitic, phthalic and tartaric acids.

As mentioned above, the subject compounds possess valuable pharmacological properties. On the basis of gross behavioral effects, hexobarbital sleeping time potentiation, synergism of alcohol sedation and antagonism of amphetamine stimulation it was concluded that these compounds are central depressant agents.

Merely by way of illustration, the compounds of Example 3, 2-(4-pyridyl)-2,3-dihydro-4H-1,3-benzoxazine-4-one, which has an $LD_{50}$ of 220 mg./kg. in mice i.p., has been found to be a depressant agent at a dose of 75 mg./kg. i.p., with a very short duration of action (½ hour). The compound of Example 2, 2-(3-pyridyl)-2,3-dihydro-4H-1,3-benzoxazine-4-one, which has an $LD_{50}$ of 940 mg./kg. in mice i.p. and an oral toxicity of 1500 mg./kg., has anti-aggressive properties in mice at 200 mg./kg. p.o. which last for 4 hours and 50 mg./kg i.p. It has been tested in the squirrel monkey and it elicited in a dose of 235 mg/kg i.p., a decrease in body temperature, heart rate and spontaneous and induced motor activity. A p.o. dose of 470 mg./kg. elicited in general, the same changes, but to a lesser degree. Thus this compound can be evaluated as a CNS depressant with a therapeutic ratio of 18.

The subject compounds possess also analgetic properties.

These new compounds and the methods for their preparation may be exemplified more fully by the following illustrative examples; the scope of the invention is, however, not limited thereto. The temperatures therein are given in degrees centigrade.

*Example 1.—2-(2-pyridyl)-2,3-dihydro-4H-1,3-benzoxazine-4-one*

To a solution of 27.4 g. of salicylamide, 21.5 g. of 2-pyridylaldehyde in 250 ml. of chloroform was added 12.5 g. of sulfuric acid with shaking. The solution was then refluxed for 26 hours in a flask fitted with Soxhlet extractor, containing anhydrous calcium chloride in a tumble. The chloroform was evaporated and the residue was treated with 5% sodium hydroxide solution. The colorless solid separated, was filtered, washed with cold water and dried. The yield of crude product was 4.2 g. (9.3%); M.P. 115–119°. It was recrystallized from benzene-pet. ether to give colorless tiny crystals, M.P. 119–120°.

Anal. for $C_{13}H_{10}N_2O_2$—Calc'd: C, 69.02; H, 4.46; N, 12.37. Found: C, 69.20; H, 4.76; N, 12.52.

*Example 2.—2-(3-pyridyl)-2,3-dihydro-4H-1,3-benzoxazine-4-one*

To a solution of 27.4 g. of salicylamide 21.5 g. of 3-pyridylaldehyde in 200 ml. of chloroform was added 12.5 g. of sulfuric acid with shaking. The solution was then refluxed for 10 hours in a flask fitted with a Soxhlet extractor containing anhydrous calcium chloride in the tumble. The chloroform was evaporated and the residue was treated with 200 ml. of 5% cold sodium hydroxide solution. The colorless solid formed was filtered and washed with cold water and dried. The yield of crude product was 31 g. (70%); M.P. 165–168. It was recrystallized from benzene to give colorless tiny needles, M.P. 167–168°.

Anal. for $C_{13}H_{10}N_2O_2$—Calc'd: C, 69.02; H, 4.46; N, 12.39. Found: C, 69.12; H, 4.57; N, 12.13.

*Example 3.—2-(4-pyridyl)-2,3-dihydro-4H-1,3-benzoxazine-4-one*

To a solution of 27.4 g. of salicylamide, 21.5 g. of 4-pyridylaldehyde in 200 ml. of chloroform was added 12.5 g. of sulfuric acid with shaking. The solution was then refluxed for 12 hours in a flask fitted with a Soxhlet extractor containing anhydrous calcium chloride in the tumble. The chloroform was evaporated and the residue was treated with 200 ml. of 5% cold sodium hydroxide solution. The colorless solid separated, was filtered, washed with cold water and dried. The yield of crude product was 12.5 g. (38%). It was recrystallized from benzene to give colorless crystals, M.P. 171–172°.

Anal. for $C_{13}H_{10}N_2O_2$—Calc'd: C, 69.02; H, 4.46; N, 12.37. Found C, 69.13; H, 4.59; N. 12.66.

*Example 4.—2-methyl-2-(3-pyridyl)-2,3-dihydro-4H-benzoxazine-4-one*

A mixture of 27.5 g. of salicylamide, 24.1 g. of 3-acetylpyridine, 12.5 of sulfuric acid and 200 ml. of chloroform was refluxed with stirring for 15 hours in a flask fitted with a Soxhlet extractor containing anhydrous calcium chloride. Evaporation of chloroform and treatment of the residue with cold 5% sodium hydroxide solution gave 22 g. (40%) of colorless solid; M.P. 135–140°. It was recrystallized from benzene to give colorless short needles, M.P. 235–236°.

Anal. for $C_{14}H_{12}N_2O_2$—Calc'd: C, 69.99; H, 5.03; N, 11.66. Found C, 70.27; H., 5.06; N, 11.73.

*Example 5.—2-(3-pyridyl)-6-chloro-2,3-dihydro-4H-benzoxazine-4-one*

A mixture of 8.6 g. of 5-chlorosalicylamide, 5.5 g. of 3-pyridylaldehyde, 3.15 g. of sulfuric acid and 200 ml. of chloroform was refluxed with stirring for 24 hours in a flask fitted with a Soxhlet extractor containing anhydrous calcium chloride. The solid separated, was filtered and treated with 5% of sodium hydroxide solution. The insoluble material was filtered and weighted 4.7 g. (36%); M.P. 174–176°. It was recrystallized from benzene to give colorless crystals, M.P. 175–176°.

Anal. for $C_{13}H_9N_2O_2Cl$—Calc'd: C, 59.88; H, 3.48; N, 10.75. Found: C, 60.01; H, 3.60; N, 11.10.

*Example 6.—2-(4-pyridyl)-6-chloro-2,3-dihydro-4H-benzoxazine-4-one*

To a mixture of 8.6 g. of 5-chlorosalicylamide, 5.5 g. of 4-pyridylaldehyde and 200 ml. of chloroform was added 3.15 g. of sulfuric acid with stirring and refluxing for 20 hours in a flask fitted with Soxhlet extractor containing anhydrous calcium chloride. The solid, which separated, was filtered and treated with sodium hydroxide solution. The insoluble material was filtered and weighed 1.8 g. (14%); M.P. 186–192°. It was recrystallized from benzene-pet. ether to give colorless crystals, M.P. 207°.

Anal. for $C_{13}H_9N_2O_2Cl$—Calc'd: C, 59.88; H, 3.48; N, 10.75. Found: C, 60.14; H, 3.65; N, 10.81.

What is claimed is:
1. A compound selected from the group consisting of derivatives of 2,3-dihydro-1,3-benzoxazinones of the formula

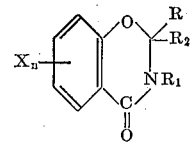

wherein:
R and $R_1$ are members of the group consisting of hydrogen and lower alkyl,
$R_2$ is taken from the group consisting of 2-pyridyl, 3-pyridyl, and 4-pyridyl,
X is selected from the group consisting of hydrogen, halogen, hydroxy, lower alkoxy, lower alkyl, amino, nitro and lower alkylenedioxy,
$n$ is an integer of from 1 to 3 and the nontoxic, pharmaceutically acceptable acid addition salts thereof.

2. 2-(2-pyridyl)-2,3-dihydro-4H-1,3-benzoxazine-4-one.
3. 2-(3-pyridyl)-2,3-dihydro-4H-1,3-benzoxazine-4-one.
4. 2-(4-pyridyl)-2,3-dihydro-4H-1,3-benzoxazine-4-one.
5. 2-methyl-2-(3-pyridyl)-2,3-dihydro-4H-benzoxazine-4-one.
6. 2-(3-pyridyl-6-chloro-2,3-dihydro-4H-benzoxazine-4-one.
7. 2-(4-pyridyl-6-chloro-2,3-dihydro-4H-benzoxazine-4-one.

References Cited by the Examiner

UNITED STATES PATENTS

| | | | |
|---|---|---|---|
| 2,470,085 | 5/1949 | Harvill et al. | 167—65 |
| 2,532,292 | 12/1950 | Cusic | 260—570 |
| 2,835,668 | 5/1958 | Shapiro et al. | 260—244 |
| 2,943,087 | 6/1960 | Ohnacker et al. | 260—244 |

FOREIGN PATENTS 959,825   3/1957   Germany.

OTHER REFERENCES

Bernthsen et al.: "Organic Chemistry," 1931 ed., pp. 567–571 (Blackie).

Burger: "Medicinal Chemistry," 2nd ed., pp. 72–77 (Interscience) (1960).

Fieser et al.: "Organic Chemistry," 3rd ed., pp. 796, 806–810, Reinhold (1956).

Sidgwick: "Organic Chemistry of Nitrogen," 1937 ed., pp. 516–517, 522–523 (Oxford).

JOHN D. RANDOLPH, *Acting Primary Examiner.*
IRVING MARCUS, WALTER A. MODANCE,
*Examiners.*
ROBERT T. BOND, *Assistant Examiner.*